(12) United States Patent
Freeman

(10) Patent No.: US 11,076,634 B2
(45) Date of Patent: Aug. 3, 2021

(54) METERED SMOKING APPARATUS

(71) Applicant: Element Extreme LLC, Woodland Hills, CA (US)

(72) Inventor: Daniel Freeman, Woodland Hills, CA (US)

(73) Assignee: ELEMENT EXTREME LLC, Woodland Hills, CA (US)

( * ) Notice: Subject to any disclaimer, the term of this patent is extended or adjusted under 35 U.S.C. 154(b) by 285 days.

(21) Appl. No.: 16/128,087

(22) Filed: Sep. 11, 2018

(65) Prior Publication Data
US 2019/0075841 A1 Mar. 14, 2019

Related U.S. Application Data

(60) Provisional application No. 62/557,711, filed on Sep. 12, 2017.

(51) Int. Cl.
| | |
|---|---|
| *A24D 1/02* | (2006.01) |
| *G01B 3/00* | (2006.01) |
| *G01B 3/1003* | (2020.01) |
| *G01B 3/1084* | (2020.01) |

(52) U.S. Cl.
CPC ............ *A24D 1/022* (2013.01); *G01B 3/004* (2013.01); *G01B 3/1003* (2020.01); *G01B 3/1084* (2013.01)

(58) Field of Classification Search
None
See application file for complete search history.

(56) References Cited

U.S. PATENT DOCUMENTS

| | | | | |
|---|---|---|---|---|
| 4,319,587 A | * | 3/1982 | Moser | A24D 1/12 131/270 |
| 2012/0255568 A1 | * | 10/2012 | Van Den Berg | A24D 3/04 131/331 |
| 2015/0098906 A1 | * | 4/2015 | Farrow | A24C 5/10 424/10.2 |

* cited by examiner

*Primary Examiner* — Michael H. Wilson
*Assistant Examiner* — Katherine A Will
(74) *Attorney, Agent, or Firm* — Sughrue Mion, PLLC; Richard C. Turner

(57) ABSTRACT

A metered smoking apparatus includes a burnable media including indicia that visually represent a plurality of smokable units of a smokable substance or an active ingredient thereof, each of the smokable units corresponding to a same predetermined quantity of the smokable substance or the active ingredient thereof, and when the smokable substance is rolled within the burnable media, the burnable media is configured such that the indicia are sequentially burned in a burn line direction that is a direction in which a burn line burns when the metered smoking apparatus is smoked, to thereby indicate consumption of the predetermined quantity on a unit-by-unit basis.

9 Claims, 6 Drawing Sheets

METERED SMOKING APPARATUS

CROSS-REFERENCE TO RELATED APPLICATION

This non-provisional patent application claims priority under 35 U.S.C. 119 to U.S. provisional patent application 62/557,711, filed on Sep. 12, 2017 in the U.S. Patent and Trademark Office, the disclosure of which is incorporated herein in its entirety by reference.

BACKGROUND

1. Field

Exemplary embodiments disclosed herein relate to metered smoking apparatuses and methods of manufacturing thereof, and more particularly, to metered smoking apparatuses having indicia thereon which indicate metered quantities of a smokable product or an active ingredient thereof.

2. Description of the Related Art

In general, smoking apparatuses such as cigarettes or joints are typically created by pre-filling substances such as tobacco or marijuana into flexible burnable media provided in tubular or conical form, or by employing rolling materials made of the burnable media and then rolling the rolling materials into substantially cylindrical or conical shapes. For example, smoking apparatuses such as cigarettes or medical marijuana joints may be pre-filled in a factory setting. In this case, the burnable media may be formed into a predetermined shape, such as a cylinder or cone, and then filled from an opening in the top thereof with a substance, such as tobacco, marijuana, and/or other substances. The smoking apparatus would then be sealed and ready for end user consumption. It is also possible for users to purchase the burnable media separately in the form of rolling materials and then roll the burnable media around the substance to prepare the smoking apparatus for consumption. Once the smoking apparatus is lit, the smoke from these substances is inhaled by a user, thereby enabling the user to consume a desired active ingredient contained within the substance, such as nicotine or THC.

For various reasons, users may not want to consume an entire cigarette or joint in a single sitting. For example, the user may be concerned about the adverse physical or psychological effects of consuming a substantial quantity of a substance in a short period of time. Alternatively, the user may have financial reasons for desiring to restrict the quantity of a substance consumed during a single smoking session. Importantly for medical usage in particular, a user may need to consume a precisely measured fraction (dose) of a smoking substance during a single sitting. For example, a user of medical marijuana may need to consume a certain predetermined amount, such as a certain number of milligrams, of active ingredient(s) of medical marijuana during a single sitting. However, the conventional methods using pre-filled burnable media or rolling materials made of such media do not provide any effective indication of the quantity of the substance or its active ingredient being inhaled by the user, and thus, users of the conventional burnable media may end up smoking more or less than a desired amount of a substance or active ingredient during a smoking session.

SUMMARY

Exemplary embodiments disclosed herein relate to metered smoking apparatuses and methods of manufacturing thereof, which enable a user to easily monitor and control a precise quantity of a substance and/or an active ingredient of the substance being consumed while smoking.

Additional aspects will be set forth in part in the description which follows and, in part, will be apparent from the description, or may be learned by practice of the presented exemplary embodiments.

According to an aspect of an exemplary embodiment, there is provided a metered smoking apparatus including: a burnable media including indicia that visually represent a plurality of smokable units of a smokable substance or an active ingredient thereof, each of the smokable units corresponding to a same predetermined quantity of the smokable substance or the active ingredient; wherein the burnable media is configured such that the indicia are sequentially burned in a burn line direction that is a direction in which a burn line burns when the metered smoking apparatus is smoked, to thereby indicate consumption of the predetermined quantity on a unit-by-unit basis.

The burnable media may further include an axis oriented parallel to the burn line direction, and the indicia may include hash marks oriented perpendicularly along the axis.

The predetermined quantity may be a weight or volume of the smokable substance, and the hash marks may employ a cumulative linear methodology by which the hash marks are evenly spaced apart from each other along the burn line direction to indicate a cumulative increase in the weight or the volume of the smokable substance consumed.

The hash marks may be labeled in an ascending order of integers in the burn line direction.

The predetermined quantity may alternatively and preferably be an amount of active ingredient contained within the smokable substance, and the hash marks may employ a cumulative non-linear methodology by which the hash marks are spaced apart from each other in a non-linear manner along the burn line direction to indicate a cumulative increase in the consumed active ingredient of the smokable substance. The spacing is not linear due to self-concentration of the active ingredient within the remaining amount of unsmoked substance, as smoking proceeds.

The non-linearly spaced apart hash marks may be configured such that spaces between adjacent ones of the hash marks decrease in the burn line direction, to thereby compensate for self-concentration by, e.g., resin buildup in the burn line direction, such that each of the units contains a same amount of the active ingredient.

The burnable media may further include an axis oriented parallel to the burn line direction, and the indicia may include dose units oriented along the axis, where each of the dose units indicates a same dose of the predetermined quantity.

The predetermined quantity may be a weight or volume of the smokable substance, and the dose units may employ a dose unit linear methodology by which the dose units are the same length as each other along the burn line direction, such that each dose unit indicates a same weight or volume of the smokable substance.

The predetermined quantity may be an active ingredient contained within the smokable substance, and the dose units may employ a dose unit non-linear methodology by which the lengths of the dose units decrease in the burn line direction, to thereby account for self-concentration during smoking, via e.g., resin buildup, such that each of the dose units contains a same amount of the active ingredient.

The metered smoking apparatus may have a conical shape that decreases in diameter in the burn line direction.

The burnable media may further include an axis oriented parallel to the burn line direction, the indicia may include hash marks oriented perpendicularly along the axis, and the hash marks may be labeled in a descending order of integers in the burn line direction.

The metered smoking apparatus may further include: a filter provided at the end of the burnable media opposite an end of the burnable media that is initially lit.

According to an aspect of another exemplary embodiment, there is provided a burnable media in the form of a rolling material to be rolled around a smokable substance to thereby create a metered smoking apparatus, the burnable media including: indicia that visually represent a plurality of smokable units of the smokable substance or an active ingredient thereof, each of the smokable units corresponding to a same predetermined quantity of the smokable substance or the active ingredient; and wherein the burnable media is configured such that the indicia are sequentially burned in a burn line direction that is a direction in which a burn line burns when the metered smoking apparatus is smoked, to thereby indicate consumption of the predetermined quantity on a unit-by-unit basis.

The burnable media may further include an axis oriented parallel to the burn line direction, the indicia may include hash marks oriented perpendicularly along the axis, the predetermined quantity may be a weight or volume of the smokable substance, and the hash marks may employ a cumulative linear methodology by which the hash marks are evenly spaced apart from each other along the burn line direction to indicate a cumulative weight or volume of the smokable substance being consumed.

The burnable media may further include an axis oriented parallel to the burn line direction, the indicia may include hash marks oriented perpendicularly along the axis; the predetermined quantity may be an amount of active ingredient contained within the substance, and the hash marks may employ a cumulative non-linear methodology by which the hash marks are spaced apart from each other in a non-linear manner along the burn line direction to indicate a cumulative increase in the consumed active ingredient of the smokable substance. The spacing is not linear due to self-concentration of the active ingredient within the remaining amount of unsmoked substance, as smoking proceeds.

The non-linear spaced apart hash marks may be configured such that spaces between adjacent ones of the hash marks decrease in the burn line direction, to thereby compensate for self-concentration by, e.g., resin buildup in the burn line direction, such that each of the smokable units contains a same amount of the active ingredient.

The burnable media may further include an axis oriented parallel to the burn line direction, the indicia may include dose units oriented along the axis, where each of the dose units indicates a same dose of the predetermined quantity, and the predetermined quantity may be a weight or volume of the smokable substance, and the dose units may employ a dose unit linear methodology by which the dose units are the same length as each other along the burn line direction, such that each dose unit indicates a same weight or volume of the smokable substance.

The burnable media may further include an axis oriented parallel to the burn line direction, the indicia may include dose units oriented along the axis, where each of the dose units indicates a same dose of the predetermined quantity, and the predetermined quantity may be an active ingredient contained within the smokable substance, and the dose units may employ a dose unit non-linear methodology by which the lengths of the dose units decrease in the burn line direction, to thereby compensate for self-concentration via, e.g., resin buildup, such that each of the dose units contains a same amount of the active ingredient.

According to an aspect of another exemplary embodiment, there is provided a method of manufacturing a metered smoking apparatus, the method including: providing indicia to a burnable media, the indicia visually representing a plurality of smokable units of a smokable substance or an active ingredient thereof, each of the smokable units corresponding to a same predetermined quantity of the smokable substance or the active ingredient; and rolling the burnable media with the indicia provided thereon to thereby create the metered smoking apparatus, wherein the burnable media is configured such that the indicia are sequentially burned in a burn line direction that is a direction in which a burn line burns when the metered smoking apparatus is smoked, to thereby indicate consumption of the predetermined quantity on a unit-by-unit basis.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
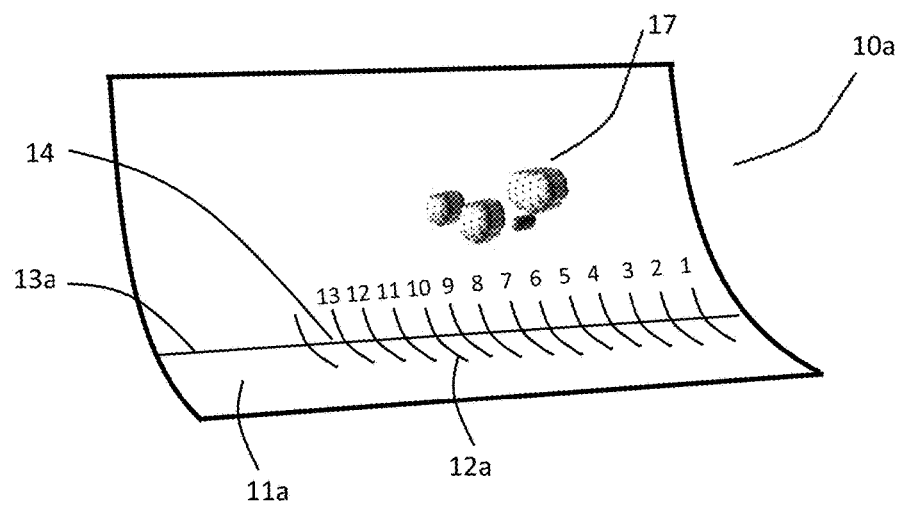
FIG. 1A is a perspective view illustrating a burnable media employing a cumulative linear methodology according to an exemplary embodiment.

Hereinafter, metered smoking apparatuses and methods of manufacturing thereof according to exemplary embodiments will be described with reference to the accompanying drawings.

According to exemplary embodiments, it is understood that when a material is referred to as being "rolled around" a substance, the material can be directly wrapped around the substance such that the material directly contacts the substance, or can have intervening substances or layers between the material and the substance. Moreover, according to exemplary embodiments, the term "rolled around" and similar terms are intended to cover many different techniques of preparing a smoking apparatus, including for example, pre-rolling a burnable media (e.g., cigarette or joint) in a factory setting. More specifically, the term "rolled around" and similar terms may refer to a technique performed in a factory or other mass production facility whereby the media material is rolled into a certain shape before the substance is filled and packed within the media material, and then the substance is packed inside the pre-rolled material. In this case, the burnable media may be formed into a predetermined shape, such as a cylinder or cone, by machines or people in the factory, and then a substance, such as tobacco, marijuana, and/or other substances may be filled and packed into the already rolled burnable media through an opening at an end thereof and sealed. The smoking apparatus would thus be sealed in the factory and delivered to the user in a completely pre-rolled form. In this way, it is possible to mass produce smoking apparatuses such as cigarettes or joints according to precise criteria, e.g., physical dimensions, weight, volume, concentration of active ingredient, densities of various substances, size of grinded material, etc. These pre-filled smoking apparatuses would not require any additional rolling by a user, and would be available for immediate consumption by simply lighting and smoking the smoking apparatus. According to another aspect of certain exemplary embodiments, it is also possible for end users to purchase burnable media separately and then add the substance to the burnable media. In this case, the burnable media could be pre-rolled into a certain shape (e.g., cylinder or cone), so that the user simply needs to add substance into an opening of the burnable media and then seal the filled burnable media, or could be sold as a flat burnable media and the user would then need to roll the flat burnable media around the substance. In general, exemplary embodiments cover any and all techniques by which substances, such as marijuana, tobacco, etc., can be contained within a burnable media and smoked by a user, although it is expected that pre-filled smoking apparatuses which are rolled in a factory setting may be a highly desirable implementation.

It will be further understood that the terms "comprise" and/or "comprising," when used in this specification, specify the presence of stated features or operations, but do not preclude the presence or addition of one or more other features or operations.

As used herein, the term "unit", also referred to as a "smokable unit", and similar terms may refer to a unit of a substance that is measured in some way. For example, the "smokable unit" may have a certain predetermined mass of a smokable substance (e.g., 1 g of tobacco or marijuana), may have a certain quantity of an active ingredient within the substance regardless of the mass (e.g., 1 mg nicotine, THC, cannabidiol (CBD), etc.), or may have some other measured physical or chemical characteristic that is desired. Thus, the "unit" or "smokable unit" may be any kind of quantity that may be measured using many different techniques applicable to various states of matter, including solids, liquids, and gases. In this way, the "unit" can refer to a quantity that is metered or measured based on numerous different physical or chemical characteristics, e.g., weight (e.g., milligrams), volume (e.g., milliliters), density, burn rates, burn temperatures, etc.

The accuracy of the metered information can depend on various factors. Some examples of such factors include the potency of the substance in the smoking apparatus (e.g., cigarette/joint), the packing density of the substance within the smoking apparatus, the geometrical shape of the cigarette/joint, drug losses during combustion, drug loss during idle time, transfer characteristics of the smoke through the cigarette/joint and mouthpiece, and other factors.

Several of the above-mentioned variables may be accounted for by routine technical investigation within the capabilities of those of skill in the art. Developments in testing, mixing, packing techniques and processing, packing machinery, and so forth will reduce the error effects of these variables.

Additionally, according to exemplary embodiments, smoking apparatuses include "indicia", such as hash marks, dose marks, or other types of visual indicators, that are divided into a plurality of units and indicate a same predetermined quantity related to a substance per each of the units. Thus, the "indicia" are used to indicate the "units" to a user smoking the smoking apparatus. Although certain aspects of exemplary embodiments illustrate the indicia as hash marks or dose marks, exemplary embodiments are not limited thereto, and the term "indicia" can refer to any kind of information that indicates a unit of consumption to a user. The "indicia" can be any of many different types of tactile or visual indicators, such as hash marks, dose units, color coded symbols, letters, numbers, artwork, other symbols or characters; notches, perforations and so forth in the rolling paper, or portions of substance which burn in a particular way (e.g., different colors or types of flame to indicate the end of a unit, etc.). Moreover, the "indicia" are not limited to being tactile or visual indicators, and may also be audio indicators, etc.

It should be understood that the scope of the exemplary embodiments is not limited by the description of certain exemplary embodiments below and matters that can be derived by those of ordinary skill in the art fall within the scope of the exemplary embodiments. Exemplary embodiments will be described in detail with reference to the accompanying drawings below.

FIG. 1A is a perspective view illustrating a burnable media employing a cumulative linear methodology according to an exemplary embodiment.

Referring to FIG. 1A, a burnable media employing a cumulative linear methodology 10a includes a burnable media 11a that is a flexible combustible material designed to be rolled around (in-filled with) a substance 17 and lit on fire to deliver smoke to a user. When lit, the burnable media 10a and substance 17 collectively burn together in a burn line direction 18 (see arrow pointing left in FIG. 1A), which is a direction that the burn line (i.e., the lit portion of the smoking apparatus) burns. The burnable media 11a may be formed of many different types of materials known to those skilled in the art, such as, for example, hemp, rice straw, flax, wood pulp, rice-based materials, cigar wrappers, etc. The burnable media 11a may be of many different dimensions, and the substance 17 to be smoked may be many different types of substances, such as tobacco, marijuana, and other substances.

The burnable media 11a includes a series of hash marks 12a oriented along an axis 13a where the hash marks 12a function as indicia of units of the substance 17 being consumed. According to an exemplary embodiment, the axis 13a is parallel to the burn line direction 18, and the hash marks 12a are perpendicular to the axis 13a, although it is understood that exemplary embodiments are not limited to this particular configuration. According to the cumulative linear methodology, the hash marks 12a are evenly spaced apart from each other and indicate a cumulative increase in a quantity of substance being consumed. In the example shown in FIG. 1A, the hash marks 12a are labeled in an integer ascending order starting at the integer "1" on the far right side, which is the side of the burnable media 11a that is initially lit, and ascending through the integers "2", "3", "4", "5", "6", "7", "8", "9", "10", "11", "12", and "13" in a leftward direction which is the direction that the burnable media 10a burns when lit. Of course, it is understood that the hash marks 12a are not limited to being integers. The units can be many different types of units for measuring the substance 17 to be smoked. For example, each of the units can represent 1 milligram (mg) of the active ingredient in substance 17, and thus, the burnable media 11a includes 13 mg of metered units of this ingredient in the substance. Of course, it is understood that the units are not limited to representing mg, and may represent many other measurement quantities, such as 0.5 mg, 0.1 mg, 10 mg, etc. or 100 mg or larger units in the case of metering the amount of the substance per se. The units of course may be different from milligrams, grams, etc.

The burnable media 10a further optionally includes a buffer zone 14, which is a portion designed to provide a buffer between the units of substance 17 to be smoked and the portion of the burnable media 10a being held by the user. The buffer zone 14 may be filled with any kind of material that provides a buffer between the burning substance and the user's hands, to prevent burns or other discomfort.

Figure 1B:
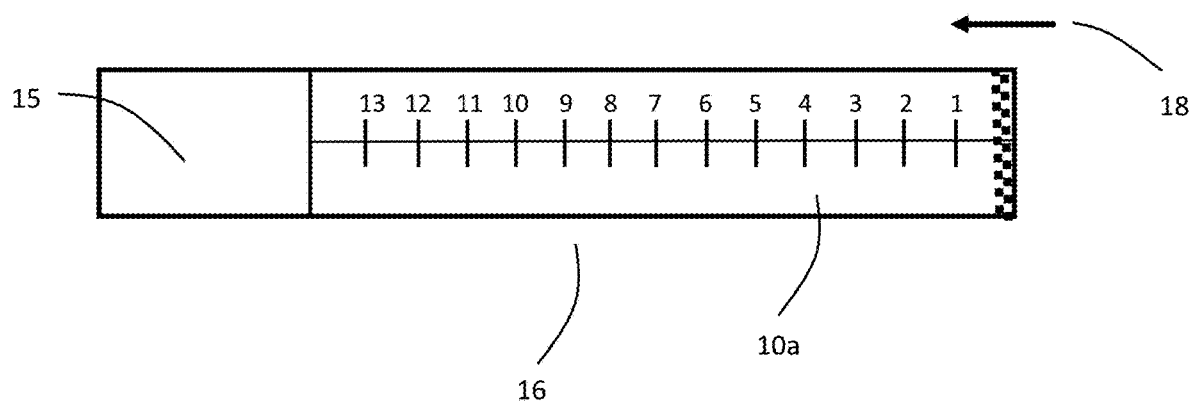
FIG. 1B is a side view illustrating a smoking apparatus including the burnable media of FIG. 1A.

FIG. 1B illustrates a smoking apparatus 16 including the burnable media employing a cumulative linear methodology 10a of FIG. 1A. As shown in FIG. 1B, the smoking apparatus 16 includes the burnable media 10a which is rolled around (in-filled with) the substance 17, and further optionally includes a filter 15. For example, if the burnable media 10a is used to mass produce cigarettes by a commercial cigarette manufacturer, the filters 15 may be added by the commercial cigarette manufacturer. Alternatively, individual smokers may desire to add the filter 15, although are certainly not required to. As another alternative, the filter 15 may not actually function as a filter per se, but may merely be a portion of the smoking apparatus 16 designed to be held by the user when smoking, e.g., a holder. The filter 15 may be made of the same or different materials as those of the burnable media material 11a.

When a user initially lights the smoking apparatus 16 shown in FIG. 1, the burnable media 10a begins burning at the end thereof (right-hand side in FIG. 1B). As the user inhales the smoke emanating from the substance 17, the smoking apparatus 16 burns until the burn line arrives at the hash mark labeled "1". At this point, the user knows he or she has consumed one unit of the substance 17. In the example shown in FIG. 1A, one unit corresponds to, for example, 100 mg of the substance 17. Thus, if a user desires to consume, for example, 800 mg of the substance 17, the user can smoke the smoking apparatus until the burn line reaches the hash mark labeled "8". In this way, the user can very easily and efficiently determine the particular amount of the substance inhaled by the user during a smoking session.

Figure 2A:
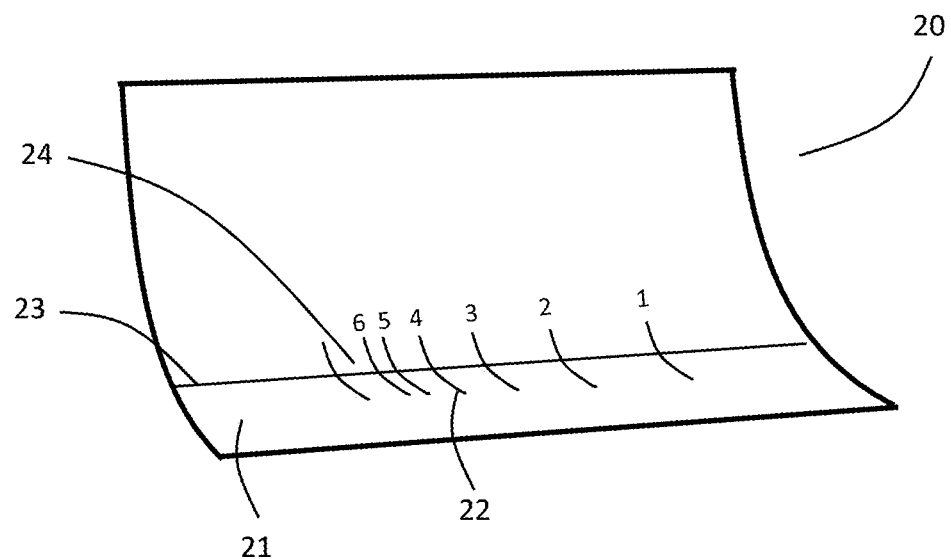
FIG. 2A is a perspective view illustrating a burnable media employing a cumulative non-linear methodology according to an exemplary embodiment.

FIG. 2A is a perspective view illustrating a burnable media employing a cumulative non-linear methodology 20 according to an exemplary embodiment. The primary difference between the burnable media 20 shown in FIG. 2A and the burnable media 10a shown in FIG. 1A is that the burnable media 20 employs a cumulative non-linear (as opposed to linear) methodology, to thereby take into account the self-concentration of the active ingredient within the unburned-stock of the substance during smoking, e.g., the buildup of resin. As is well known among users of tobacco and marijuana, when smoking a cigarette, joint, or other smoking product, resin and smoke deposits build up in the smoking product, thereby increasing the concentration of active ingredients (e.g., nicotine, THC, etc.) contained in the end of the smoking product closest to the user's lips. In more detail, as a user smokes a smoking apparatus (e.g., a joint), the smoke travels through the length of the joint towards the mouthpiece. As the smoke travels through the joint, the smoke deposits active ingredients along the way on the un-burned smokable substance. The depositing of the active ingredients increases the relative concentration of active ingredients of the un-burned smokable substance (a process also referred to as "self-concentration"). So later, when that unburned smokable substance is burned, it will have a stronger concentration of active ingredients due to the depositing of the active ingredients during earlier smoking. In this way, the smokable substance closest to the mouthpiece will have received a substantial portion of the deposited active ingredients, before being smoked. In actuality, the concentration of active ingredients in a given portion of smokable substance changes during the life of the joint according to numerous complex factors, including a distance between the given portion of the smokable substance and the front edge of the joint (the front edge being the first portion of the joint to be initially lit), the quantity of the intervening substance between the given portion of the smokable substance and the front edge, the density of the substance, the type of tobacco or the strain of marijuana, etc. These variables create a non-linear relationship between the potency and the location of a given portion of smokable substance in a joint or other smoking apparatus. The non-linear relationship may include many other factors in addition to the exemplary factors listed above.

According to exemplary embodiments, the method for determining the relationship between potency and other characteristics of a portion of smokable substance includes initially capturing various samples of a specific volume of smoke generated at different times and positions in the life of the joint, and analyzing each of the samples of smoke to determine a concentration of active ingredients in each of the samples. Using this data, a data model is built which reveals the relationship between the amount of active ingredients consumed and other factors, such as quantity of active ingredient (e.g., THC) vs. a position in the joint, quantity of active ingredient vs. density of overall substance, quantity of active ingredient vs. type of marijuana, quantity of active ingredient vs. burn rate, etc. The non-linear relationship determined from the data model informs the location of indicia to be placed on burnable media.

The burnable media 20 shown in FIG. 2A accounts for the increased concentration of the active ingredient by nonlinearly spacing out the hash marks based on the increase in the active ingredient per unit length.

As shown in FIG. 2A, the burnable media 21 may be substantially the same as the burnable media 11a shown in FIG. 1A, although is not limited thereto. The burnable media 21 includes a series of hash marks 22 oriented along an axis 23 where the hash marks 22 function as indicia of units of the active ingredient being consumed. The axis 23 may be oriented parallel to the burn line direction 18. According to the cumulative non-linear methodology, the hash marks 12a are spaced apart from each other at distances which decrease in a direction moving away from the end of the burnable media 21 that is initially lit (i.e., decrease in the leftward direction in FIG. 2A). As described above, one reason for this decrease in distances, i.e., a nonlinear progression, is that the units located closer to the user's lips will build up more resin than those units located closer to the initially lit end, and thus, do not need to be as lengthy to provide the same quantity of active ingredient as those units located closer to the initially lit end. Thus, for example, if the substance 17 contained in between the hash marks labeled "1" and "2" contains a certain quantity x of an active ingredient (e.g., THC), the quantity of the active ingredient contained in between the hash marks labeled "5" and "6" may be approximately the same as x even though the length between the hash marks "5" and "6" is significantly shorter than the length between the hash marks "1" and "2".

The burnable media 21 further optionally includes a buffer zone 24, which may be substantially the same as the buffer zone 14 of the burnable media 10a, although not limited thereto.

Figure 2B:
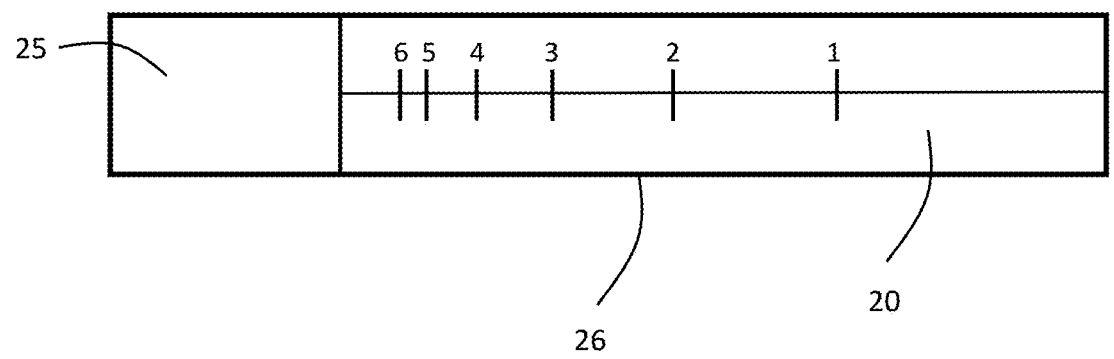
FIG. 2B is a side view illustrating a smoking apparatus including the burnable media of FIG. 2A.

FIG. 2B illustrates a smoking apparatus 26 including the burnable media employing a cumulative non-linear methodology 20 of FIG. 2A. As shown in FIG. 2B, the smoking apparatus 26 includes the burnable media 21 which is rolled around the substance 17, and further optionally includes a filter 25 which may be substantially the same as the filter 15 shown in FIG. 1A.

When a user initially lights the smoking apparatus 26 shown in FIG. 2B, the burnable media 21 begins burning at the end thereof (right-hand side in FIG. 2B). As the user inhales the smoke emanating from the substance 17, the smoking apparatus 26 burns until the burn line arrives at the hash mark representing the unit "1". At this point, the user knows he or she has consumed a certain predetermined quantity x of active ingredient (e.g., nicotine, THC), such as 1 mg. Then, if a user wants to smoke a predetermined quantity x of active ingredient a second time, the user can continue to smoke the smoking apparatus 26 until the burn line arrives at the hash mark labeled "2". In this way, the user can very easily and efficiently control and monitor the particular quantity of the active ingredient inhaled by the user.

According to an exemplary embodiment, the smoking apparatus 26 may be a pre-filled smoking apparatus (e.g., a joint) that is manufactured in a factory setting to achieve manufacturing of highly accurate pre-filled joints that precisely include the same quantity of active ingredient per each smokable unit. To manufacture an accurately filled smoking apparatus 26, the manufacturing techniques according to exemplary embodiments require consideration of numerous different factors. For example, when the substance 17 is marijuana and the active ingredient of the substance 17 is THC, the manufacturing of the pre-filled joints requires consideration of some or all of the following factors:

(a) potency: the potency of the substance 17 is preferably controlled. Typically, the potency is controlled to be within a specific range such as, for example 20-22% THC, with 21% THC being the desired concentration. Other ranges are also possible, and in general lower potency ranges can be obtained by blending lower and higher potency parts of the marijuana plant.

(b) size/texture: the grind of substance 17 is of a consistent size so that the substance 17 can be readily filled and packed into a joint.

(c) burn rate: the substance 17 may also need to be 'ground down' (or chopped) into an appropriate size to achieve a good burn rate. Preferably, the substance 17 is ground down to a size which enables the smoking apparatus 26 to stay lit between puffs, without burning too fast.

(d) density: the substance 17 is filled and packed into pre-rolled joints in a controlled density.

According to another aspect of exemplary embodiments, the smoking apparatus 26 is not limited to being filled and packed in a factory setting, and may instead be made by an end user, in which case the end user may either fill and pack the smoking apparatus 26 by hand or with the aid of devices configured for an end user to pack a smoking apparatus. In either case, the burnable media 21 provides a significantly improved option over the conventional burnable media which does not have any indication of dosage of any kind.

Figure 3A:
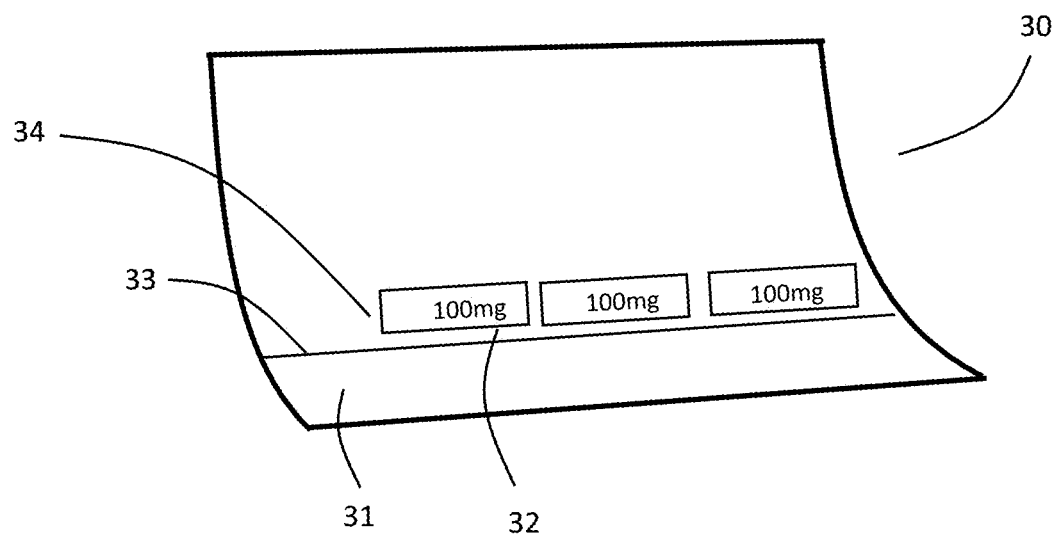
FIG. 3A is a perspective view illustrating a burnable media employing a dose unit linear methodology according to an exemplary embodiment.

FIG. 3A is a perspective view illustrating a burnable media employing a dose unit linear methodology 30 according to an exemplary embodiment. The primary difference between the burnable media 30 shown in FIG. 3A and the burnable media 10a shown in FIG. 1A is that the burnable media 30 employs dose units 32 instead of the linearly increasing hash marks 12a. The dose units 32 may have certain practical advantages, such as, for example, if a user always wants to consume the same dose of substance 17 during a sitting, then the dose units 32 are very easy to monitor and do not require any calculation to remember how much substance 17 has been smoked.

As shown in FIG. 3A, the burnable media 31 may be substantially the same as the burnable media 11a shown in FIG. 1A, although is not limited thereto. The burnable media 31 includes a series of dose units 32 oriented along an axis 33 where the dose units function as indicia of units of the substance 17 being consumed. The axis 33 may be oriented parallel to the burn line direction 18. According to the dose unit linear methodology, the dose units 32 are evenly spaced apart from each other and are the same length as each other, such that each dose indicates a same quantity of the substance being consumed. For example, as shown in FIG. 3B, each of the dose units 32 may correspond to a certain weight of the smokable substance, which may be the typical dose desired by the user.

The burnable media 31 further optionally includes a buffer zone 34, which may be substantially the same as the buffer zone 14 of the burnable media 10a, although is not limited thereto.

Figure 3B:
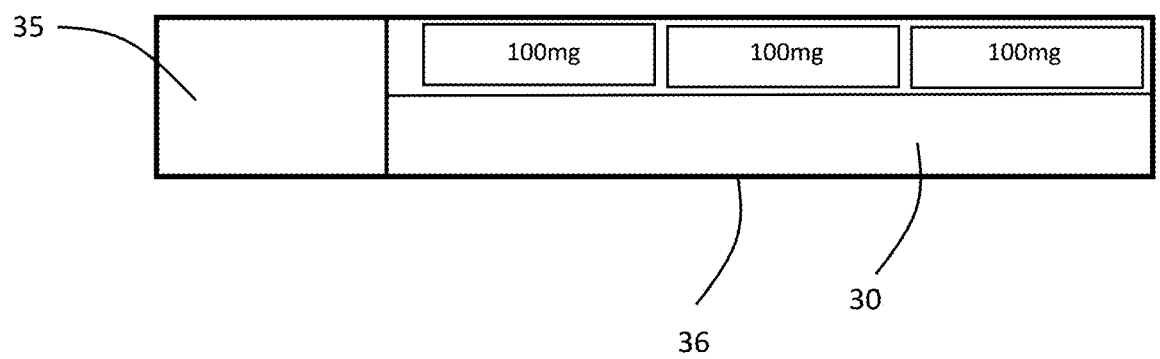
FIG. 3B is a side view illustrating a smoking apparatus including the burnable media of FIG. 3A.

FIG. 3B illustrates a smoking apparatus 36 including the burnable media 31 of FIG. 3A. As shown in FIG. 3B, the smoking apparatus 36 includes the burnable media 31 which is rolled around the substance 17, and further optionally includes a filter 35 which may be substantially the same as the filter 15 shown in FIG. 1A, although is not limited thereto.

When a user initially lights the smoking apparatus 36 shown in FIG. 3B, the burnable media 30 begins burning at the end thereof (right-hand side in FIG. 3B). As the user inhales the smoke emanating from the burning substance 17, the smoking apparatus 36 burns until the burn line arrives at the end of the first dose unit 32. At this point, the user knows he or she has consumed approximately one dose (e.g., 100 mg) of the substance 17. In this way, the user can very easily and efficiently control and monitor a particular dose of the substance 17 smoked by the user.

Figure 4A:
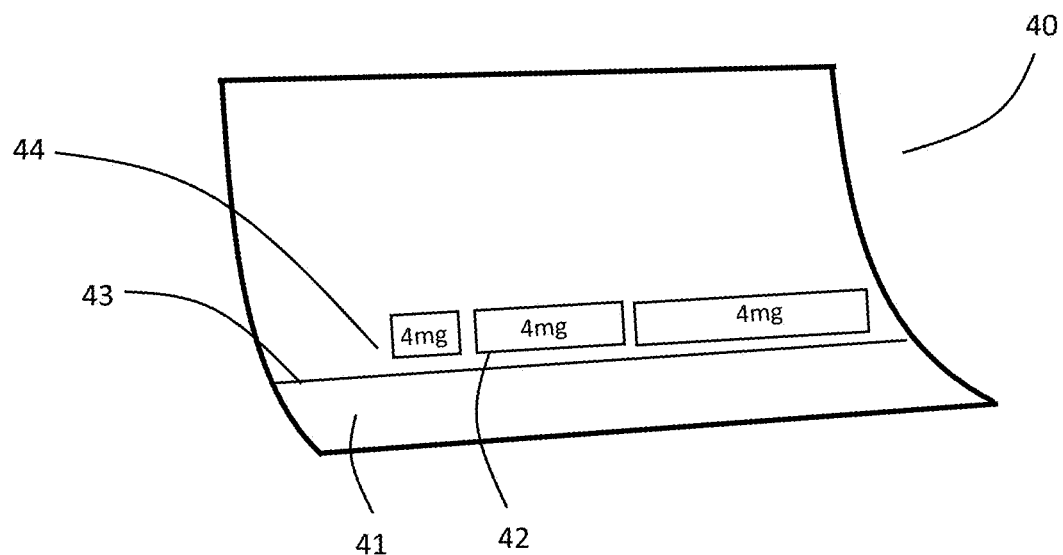
FIG. 4A is a perspective view illustrating a burnable media employing a dose unit non-linear methodology according to an exemplary embodiment.

FIG. 4A is a perspective view illustrating a metered smoking apparatus employing a dose unit non-linear methodology 40 according to an exemplary embodiment. The primary difference between the burnable media 40 shown in FIG. 4A and the burnable media 30 shown in FIG. 3A is that the burnable media 40 employs a dose unit non-linear (as opposed to linear) methodology, to thereby take into account e.g., the buildup of resin.

According to an exemplary embodiment shown in FIG. 4A, the burnable media 41 may be substantially the same as the burnable media 11a shown in FIG. 1A, although not limited thereto. According to the dose unit non-linear methodology, the dose units 42 are arranged along an axis 43 that is parallel to the burn line direction 18 and function as indicia of units of the active ingredient being consumed and have lengths which decrease in the burn line direction 18 (i.e., lengths that decrease moving in the leftward direction in FIG. 4A). The reason for this decrease in length of the dose units is substantially the same as the reason explained with respect to the cumulative non-linear methodology shown in FIG. 2A.

The burnable media 41 further optionally includes a buffer zone 44, which may be substantially the same as the buffer zone 14 of the burnable media 10*a*, although is not limited thereto.

Figure 4B:
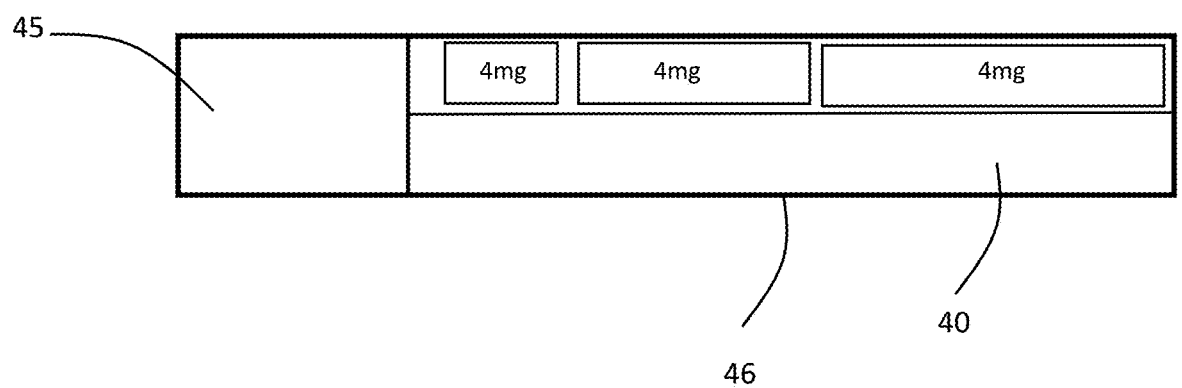
FIG. 4B is a side view illustrating a smoking apparatus including the burnable media of FIG. 3A.

FIG. 4B illustrates a smoking apparatus 46 including the burnable media 40 of FIG. 1A. As shown in FIG. 4B, the smoking apparatus 46 includes the burnable media 41 which is rolled around the substance 17, and further optionally includes a filter 45 which may be substantially the same as the filter 45 shown in FIG. 1A, although is not limited thereto.

When a user initially lights the smoking apparatus 46 shown in FIG. 3B, the substance 17 begins burning at the end thereof (right-hand side in FIG. 4B). As the user inhales the smoke emanating from the burning substance 17, the smoking apparatus 46 burns until the burn line arrives at the end of the first dose unit 42. At this point, the user knows he or she has consumed a certain predetermined quantity x of active ingredient (e.g., nicotine, THC). Then, if a user wants to smoke the predetermined quantity x of active ingredient for a second time, the user can continue to smoke the smoking apparatus 46 until the burn line arrives at the end of the second dose unit 42, which has a shorter length than the first dose unit 42 but contains the same quantity of active ingredient due to resin buildup and other previously described factors. In this way, the user can very easily and efficiently control and monitor the particular quantity of the active ingredient inhaled by the user.

Figure 5:
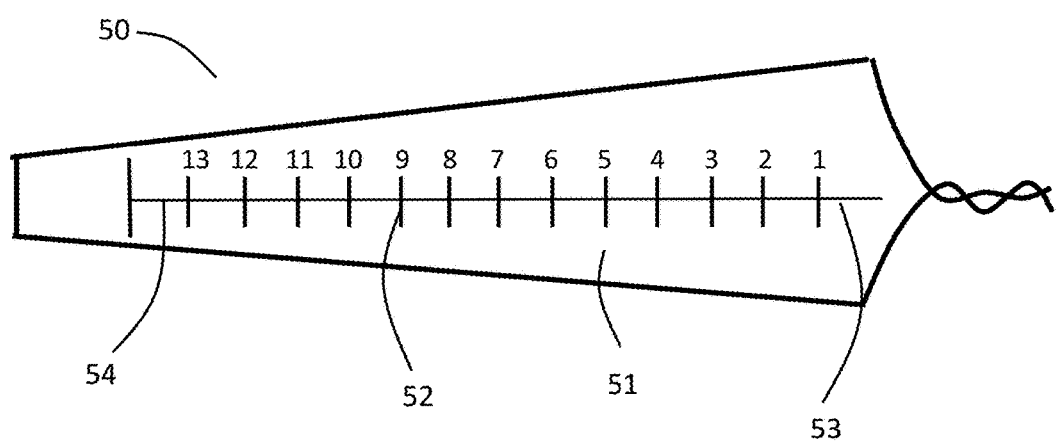
FIG. 5 is a side view illustrating a smoking apparatus having a conical shape and including a burnable media according to an exemplary embodiment.

FIG. 5 is a side view illustrating a metered smoking apparatus having a conical shape 50 and including a burnable media according to an exemplary embodiment. The primary difference between the burnable media 51 shown in FIG. 5 and the burnable media 10*a* shown in FIG. 1A is that the burnable media 51 has a conical shape, and thus, has a quantity of substance 17 that decreases per unit as the burn line burns. Thus, the quantity of the substance 17 decreases per unit in a direction in which the substance 17 burns, to thereby offset factors such as the increasing resin buildup in the same direction. As a result, the smoking apparatus 50 can have hash marks which are evenly spaced apart from each other while also indicating the same quantity of active ingredient per unit.

As shown in FIG. 5, the metered smoking apparatus 50 includes a burnable media 51. According to an exemplary embodiment, the burnable media 51 may be substantially the same as the burnable media 10*a* shown in FIG. 1A, although is not limited thereto. The burnable media 51 includes a series of hash marks 52 oriented along an axis 53 that may be parallel to the burn line direction 18, where the hash marks function as indicia of units of the active ingredient being consumed. The burnable media 50 further optionally includes a buffer zone 54, which may be substantially the same as the buffer zone 14 of the burnable media 10*a*, although is not limited thereto.

By performing careful control, the smoking apparatus 50 can be calibrated such that the hash marks 52 are evenly spaced apart and have the same deliverable quantity of active ingredient between each of the hash marks. Certain users may desire this feature. For example, if a user prefers to have the hash marks evenly spaced apart (e.g., for easy viewing), and also desires to have each of the units contain the same quantity of active ingredient, then the conical shape shown in FIG. 5 may achieve this result.

It is further understood that the smoking apparatus 50 is not limited to being conically shaped, and is also not limited to employing a cumulative linear methodology, and may instead employ any methodology according to any of the exemplary embodiments, such as the cumulative non-linear methodology shown in FIG. 2A, the dose unit linear methodology shown in FIG. 3A, the dose unit non-linear methodology shown in FIG. 4A, or some other methodology altogether.

Figure 6:
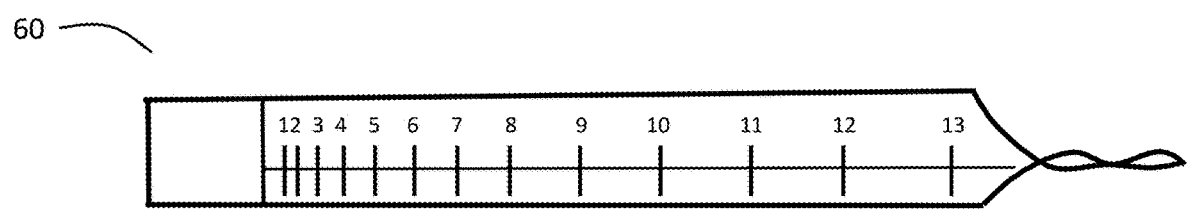
FIG. 6 is a side view illustrating a smoking apparatus including a burnable media employing a reverse cumulative methodology according to an exemplary embodiment.

FIG. 6 is a side view illustrating a smoking apparatus including a burnable media employing a reverse cumulative methodology 60 according to an exemplary embodiment. The primary difference between the smoking apparatus 60 shown in FIG. 6 and the smoking apparatus 20 shown in FIG. 2B is that the hash marks included in the smoking apparatus 60 are in a reverse order from those of the hash marks included in the smoking apparatus 20. In particular, the hash marks included in the smoking apparatus 60, which can function as indicia of units of the active ingredient, are arranged in an integer descending order, starting at the hash mark labeled with the highest value and descending down to the hash mark labeled "1". This arrangement may have certain desired benefits. For example, the hash marks in integer descending order can easily enable a user to determine how much of the active ingredient 17 remains after a smoking session. If, for example, a user smokes three smokable units of the smoking apparatus 60, the burn line will burn from the initially lit end of the smoking apparatus 60, through the hash marks "13" and "12", to the hash mark labeled "11", at which point the user knows, based on the hash mark "11", that he or she has 11 smokable units left to smoke. As another benefit, the hash marks can be replaced or supplemented by certain time of day indicia, e.g., 9:00 am, 12:00 pm, 3:00 pm, 6:00 pm, 9:00 pm, which are arranged such that the units corresponding to the earliest times of day are smoked first and the units corresponding to later times of day are positioned afterwards in order. Thus, for example, if a user needs to smoke one unit of a medical marijuana ingredient every three hours, the user would initially start smoking at 9:00 am and smoke the unit which starts or ends with the hash mark labeled "9:00 am", and then three hours later would smoke the next unit which starts or ends with the hash mark labeled "12:00 pm", etc. Thus, the smoking apparatus 60 functions as both a metered smoking apparatus and a scheduling device that helps a user stay on a fixed smoking schedule. Of course, the smoking apparatus 60 is not limited to the above examples, and the hash marks can be replaced by dose units or labeled in many different ways and many different orders, using any combination of letters, numbers, symbols, etc., to suit the needs of the user. Moreover, although the smoking apparatus 60 shown in FIG. 6 employs a cumulative non-linear methodology to account for self-concentration of the active ingredient, the smoking apparatus 60 is not limited thereto, and may employ any combination of the other methodologies according to the exemplary embodiments, including cumulative linear, dose unit linear or non-linear, tapered shapes, etc.

Figure 7:
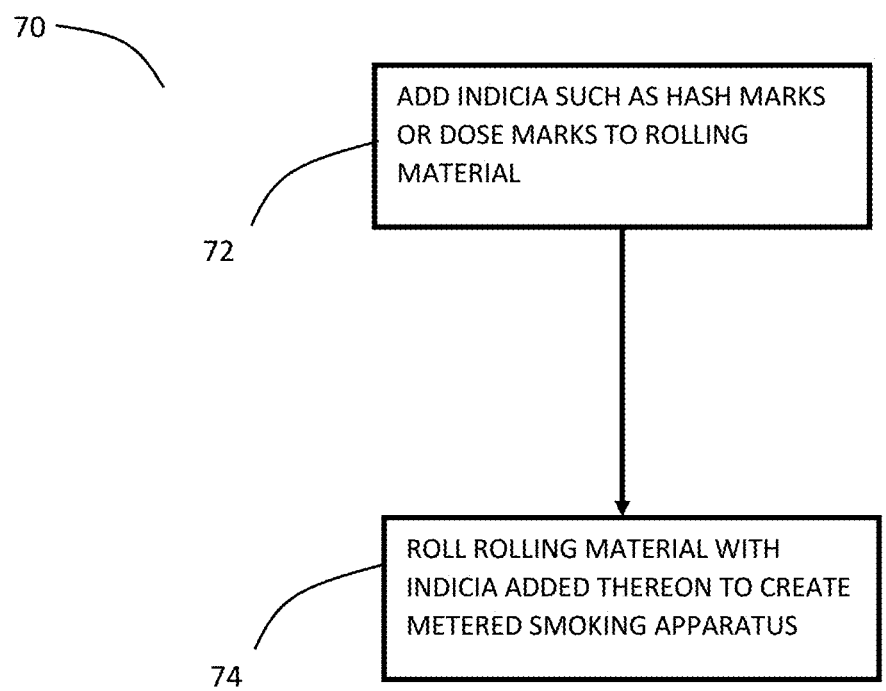
FIG. 7 is a method of manufacturing a metered smoking apparatus according to an exemplary embodiment.

FIG. 7 illustrates a method 70 of manufacturing a metered smoking apparatus and burnable media according to an exemplary embodiment.

In operation 72, a person adds indicia such as hash marks or dose units that indicate a certain quantity per unit (e.g., quantity of substance, quantity of active ingredient, etc.) to a burnable media. The hash marks or dose units can be, for example, any combination of the hash marks or dose units described above with respect to the exemplary embodiments shown in FIGS. 1-6. The person can add the indicia in any number of ways known to those skilled in the art, such as, for example, by using a machine in a factory setting, by hand, or by some combination of machine and hand. Moreover, the indicia itself can be formed of many different types of material known to those skilled in the art, and can be formed of a material that is the same as or different from the burnable media. For example, the indicia and the burnable media can both be formed of hemp, and the indicia can be a different colored hemp from the burnable media. The indicia can be printed, stamped, affixed or fastened to the burnable media using many different techniques known to those skilled in the art.

In operation 74, the person rolls the burnable media with the indicia added thereon, to thereby create a metered smoking apparatus. This operation can be completed using many different rolling techniques known to those skilled in the art, e.g., by hand, by machine, by a combination, thereof, etc. Additionally, as noted above, operation 74 can be performed either before or after the substance 17 is packed into the burnable media. For example, operation 74 can be performed in a factory setting, where the burnable media is pre-rolled into a certain shape before the substance 17 is packed therein.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metered smoking apparatus comprising:
    a burnable media comprising indicia that visually represent a plurality of smokable units of a smokable substance or an active ingredient thereof, each of the smokable units corresponding to a same predetermined quantity of the smokable substance or the active ingredient,
    wherein when the smokable substance is within the burnable media, the burnable media is configured such that the indicia are sequentially burned in a burn line direction that is a direction in which a burn line burns when the metered smoking apparatus is smoked, to thereby indicate consumption of the predetermined quantity on a unit-by-unit basis;
    wherein the burnable media further comprises an axis oriented parallel to the burn line direction, and
    the indicia comprise hash marks oriented perpendicularly along the axis;
    wherein the predetermined quantity is an active ingredient contained within the smokable substance, and the hash marks employ a cumulative non-linear methodology by which the hash marks are spaced apart from each other in a non-linear manner along the burn line direction to indicate a cumulative increase in the consumed active ingredient of the smokable substance; and
    wherein the hash marks that are spaced apart from each other in the non-linear manner are configured such that spaces between adjacent ones of the hash marks decrease in the burn line direction, to thereby compensate for self-concentration of the active ingredient in the burn line direction, such that each of the units contains a same amount of the active ingredient.

2. The metered smoking apparatus according to claim 1, wherein the hash marks are labeled in an ascending order of integers in the burn line direction.

3. The metered smoking apparatus according to claim 1, wherein
    the indicia comprise dose units oriented along the axis, where each of the dose units indicates a same dose of the predetermined quantity.

4. The metered smoking apparatus according to claim 1, wherein the metered smoking apparatus has a conical shape that decreases in diameter in the burn line direction.

5. The metered smoking apparatus according to claim 1, wherein
    the hash marks are labeled in a descending order of integers in the burn line direction, so as to indicate a remaining quantity of the smokable substance or active ingredient within the smoking apparatus.

6. The metered smoking apparatus according to claim 1, further comprising:
    a filter provided at end of the burnable media opposite an end of the burnable media that is initially lit.

7. A metered smoking apparatus comprising:
    a burnable media comprising indicia that visually represent a plurality of smokable units of a smokable substance or an active ingredient thereof, each of the smokable units corresponding to a same predetermined quantity of the smokable substance or the active ingredient,
    wherein when the smokable substance is within the burnable media, the burnable media is configured such that the indicia are sequentially burned in a burn line direction that is a direction in which a burn line burns when the metered smoking apparatus is smoked, to thereby indicate consumption of the predetermined quantity on a unit-by-unit basis;
    wherein the burnable media further comprises an axis oriented parallel to the burn line direction,
    wherein the indicia comprise dose units oriented along the axis, where each of the dose units indicates a same dose of the predetermined quantity, and
    wherein the predetermined quantity is the active ingredient contained within the smokable substance, and the dose units employ a dose unit non-linear methodology by which the lengths of the dose units decrease in the burn line direction, to thereby compensate for self-concentration, such that each of the dose units contains a same amount of the active ingredient.

8. A burnable media in the form of a rolling material to be rolled around a smokable substance to thereby create a metered smoking apparatus, the burnable media comprising:
    indicia that visually represent a plurality of smokable units of the smokable substance or an active ingredient thereof, each of the smokable units corresponding to a same predetermined quantity of the smokable substance or the active ingredient; and
    wherein the burnable media is configured such that the indicia are sequentially burned in a burn line direction that is a direction in which a burn line burns when the metered smoking apparatus is smoked, to thereby indicate consumption of the predetermined quantity on a unit-by-unit basis, wherein:
the burnable media further comprises an axis oriented parallel to the burn line direction,
the indicia comprise hash marks oriented perpendicularly along the axis;
the predetermined quantity is the active ingredient contained within the substance, and the hash marks employ a cumulative non-linear methodology by which the hash marks are spaced apart from each other in a non-linear manner along the burn line direction to indicate a cumulative increase in the consumed active ingredient of the smokable substance, and
the hash marks that are spaced apart from each other in the non-linear manner are configured such that spaces between adjacent ones of the hash marks decrease in the burn line direction, to thereby compensate for self-concentration in the burn line direction, such that each of the smokable units contains a same amount of the active ingredient.

9. A burnable media in the form of a rolling material to be rolled around a smokable substance to thereby create a metered smoking apparatus, the burnable media comprising:
indicia that visually represent a plurality of smokable units of the smokable substance or an active ingredient thereof, each of the smokable units corresponding to a same predetermined quantity of the smokable substance or the active ingredient; and
wherein the burnable media is configured such that the indicia are sequentially burned in a burn line direction that is a direction in which a burn line burns when the metered smoking apparatus is smoked, to thereby indicate consumption of the predetermined quantity on a unit-by-unit basis,
wherein:
the burnable media further comprises an axis oriented parallel to the burn line direction,
the indicia comprise dose units oriented along the axis, where each of the dose units indicates a same dose of the predetermined quantity, and
the predetermined quantity is the active ingredient contained within the smokable substance, and the dose units employ a dose unit non-linear methodology by which the lengths of the dose units decrease in the burn line direction, to thereby compensate for self-concentration, such that each of the dose units contains a same amount of the active ingredient.

* * * * *